United States Patent
Eisendrath et al.

(10) Patent No.: US 6,347,333 B2
(45) Date of Patent: *Feb. 12, 2002

(54) ONLINE VIRTUAL CAMPUS

(75) Inventors: Edwin Eisendrath, Chicago; Andrew M. Rosenfield, Lake Forest; Enio Ohmaye; Patrick Keating, both of Highland Park, all of IL (US)

(73) Assignee: UNext.com LLC, Deerfield, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,754

(22) Filed: Jun. 25, 1999

Related U.S. Application Data (60) Provisional application No. 60/116,120, filed on Jan. 15, 1999.

(51) Int. Cl.[7] .............................. G06F 15/16; G09B 3/00
(52) U.S. Cl. ..................... 709/217; 709/204; 434/350
(58) Field of Search .............................. 709/204, 217, 709/218; 345/329, 330, 331, 332; 707/3, 501, 513; 434/227, 350, 323, 336; 712/200

(56) References Cited

U.S. PATENT DOCUMENTS

| | | | |
|---|---|---|---|
| 4,820,167 A | * | 4/1989 | Nobles et al. ............... 434/336 |
| 5,267,865 A | | 12/1993 | Lee et al. |
| 5,310,349 A | | 5/1994 | Daniels et al. |
| 5,441,415 A | | 8/1995 | Lee et al. |
| 5,544,305 A | * | 8/1996 | Ohmaye et al. ............. 345/776 |
| 5,710,894 A | * | 1/1998 | Maulsby et al. ............. 345/763 |
| 5,727,950 A | | 3/1998 | Cook et al. |
| 5,788,508 A | | 8/1998 | Lee et al. |
| 5,810,605 A | | 9/1998 | Siefert |
| 5,823,788 A | | 10/1998 | Lemelson et al. |
| 5,863,208 A | | 1/1999 | Ho et al. |

(List continued on next page.)

FOREIGN PATENT DOCUMENTS

WO  WO 98/22864  5/1998

OTHER PUBLICATIONS

Japanese Patent Abstract: Publication No. 10040199, filed Feb. 13, 1998: Education Support System (http://210.141.236.197/dbpweb/connecter/guest/DBPquery/EN-GDB/wdispag—Dec. 17, 1998).

Japanese Patent Abstract: Publication No. 08235089, filed Sep. 13, 1996: Education Support System (http://210.141.236.197/dbpweb/connecter/guest/DBPquery/EN-GDB/wdispag—Dec. 17, 1998).

(List continued on next page.)

Primary Examiner—Zarni Maung
Assistant Examiner—Jason D. Cardone
(74) Attorney, Agent, or Firm—Joseph Levi, Esq.; Joseph P. Kincart, E; Clifford Chance Rogers & Wells LLP (57) ABSTRACT

A Virtual Campus including interactive work plans and administrative resources presented online through a WEB interface. Through the Virtual Campus a learner can communicate with others, create and update an individual work plan, access required resources, store work, and be apprised of Virtual University announcements. While online, learners may create work groups with other learners, use a suite of business tools, interact with a registrar, or open a library data base. In addition, an online Virtual Campus can assess those skills a student has successfully mastered by analyzing progress through the aggregate of course modules completed. Academic and career guidance can be formulated referencing the accumulated detail of the students learning experience. Each software module and element can have a list of skills associated with it. The database of skills can reflect a students capabilities in greater detail than is possible using only a final course grade or grade point average.

24 Claims, 8 Drawing Sheets

U.S. PATENT DOCUMENTS

| | | | |
|---|---|---|---|
| 5,904,485 A | | 5/1999 | Siefert |
| 5,957,699 A | * | 9/1999 | Peterson et al. ............ 434/350 |
| 5,974,446 A | | 10/1999 | Sonnenreich et al. |
| 6,014,134 A | | 1/2000 | Bell et al. |
| 6,024,577 A | * | 2/2000 | Wadahama et al. ......... 434/322 |
| 6,029,043 A | * | 2/2000 | Ho et al. .................... 434/350 |
| 6,064,856 A | * | 5/2000 | Lee et al. ................... 434/350 |

OTHER PUBLICATIONS http://www.dsu.edu/yahoo.htm: Nov. 23, 1998—http://www.courses.dsu.edu/disted/courses.htm: Nov. 23, 1998: DSU Open Internet Courses.

http://www.wcc–eun.com/wln/commons/index.html: Nov. 5, 1998—http://klaatu.oit.umass.edu/uww/uww_home.html: Nov. 5, 1998: University Without Walls.

http://www.howardcc.edu/hcc/facpres/sld003.htm: Nov. 5, 1998 (Slides 3–13 of 14) (University of Phoenix).

http://www.adec.edu/vuniv/adec/place1.html: Nov. 5, 1998: ADEC and Virtual Universities "Toward Common Vision and Action".

http://www.colorado.edu/infs/jcb/sinewave/service/virtual-campus/: Nov. 5, 1998: SINEwave The COB Virtual Campus (Distance Learning at the College of Business at UCB).

http://www.california.edu/about.html: Nov. 5, 1998: Welcome to the California Virtual University.

hhtp://www.ttu.edu/lists/acw–1/9707/0078.html: Nov. 5, 1998—Johnstone/Jones: Western Governors University.

http://www.wgu.edu/wgu/academics/dist_learning.html: Nov. 5, 1998: Distance Learning.

http://www.uophx.edu/online/on1_camp.htm: Nov. 5, 1998: Welcome to the Online Campus? (University of Phoenix).

http://www.wcc–eun.com/eun.html: Nov. 5, 1998: The Electronic University Network.

http://www.brevard.cc.fl.us/online/campus/: Nov. 5, 1998: Brevard Community College Online: Telecommute on the Information Super Highway with BCC.

http://www.apollogrp.com/: Nov. 5, 1998: Welcome to Appolo Group, Inc.

http://programs.micronpc.com/micro OLIRTR4UWVPBGP3&where=home&why=gen: Nov. 4, 1998: Micron PC: Programs: Micron University: Micron U—Home.

* cited by examiner

ONLINE VIRTUAL CAMPUS

CROSS REFERENCE TO RELATED APPLICATIONS

This application claims the benefit of provisional application entitled "Virtual University," filed Jan. 15, 1999, bearing the Ser. No. 60/116,120, the contents of which are relied upon and incorporated by reference.

BACKGROUND

This invention comprises a software learning engine offered online via a network of multimedia nodes. The learning engine can provide an educational experience wherein interactive lessons are utilized and content is designed in cooperation and partnership with academic institutions. Course content can include building blocks of knowledge and be delivered using multiple vehicles. Degrees can be granted entirely through online courses. University functions such as registration, administrative tasks, and purchasing course materials are also accomplished online.

Traditional campus based universities are limited by their physical resources in the number of learners to whom they can market their intellectual property. Classroom and campus constraints dictate a relatively small consumer base embodied as learners. Services available on a physical campus are limited by the human factors linked to each service.

In addition, fixed schedules, passive learning and an academic school year have limited traditional education models utilizing a physical campus with one teacher and many learners. One limitation of the prevailing model is manifested by it primarily being available only to people during the first stages of their life.

Known methods of offering distance learning have not been able to harness the teaching techniques and material of first tier higher education institutions. Existing methods generally require that a learner become self taught with periodic assessments by the distance learning institution.

There is a need for an educational forum that provides interactive lessons asynchronously such that a learner can participate in a lesson using an on demand schedule and also reap the benefits of an interactive learning environment. A learner should not be bound by geographical constraints. Preferably the educational forum would provide accredited courses and curriculums leading to a degree being granted. Other desirable embodiments can include learning modules directed to a specific need of a customer, for example, a corporation desiring internal education.

SUMMARY

Accordingly the present invention provides a Virtual Campus including interactive work plans and administrative resources presented online through a WEB interface. Through the Virtual Campus a learner can communicate with others, create and update an individual work plan, access required resources, store work, and be apprised of Virtual University announcements. While online, learners may create work groups with other learners, use a suite of business tools, interact with a registrar, or open a library data base. In addition, learners can store a project, present the project to others or review work of fellow learners.

In addition, an online Virtual Campus can assess those skills a student has successfully mastered by analyzing progress through the aggregate of course modules completed. Academic and career guidance can be formulated referencing the accumulated detail of the students learning experience. Each software module and element can have a list of skills associated with it. The ease or difficulty a student experiences as the student encounters each module can be databased so that it can be later referenced by the student, or other interested party. The database of skills can reflect a students capabilities in greater detail than is possible using only a final course grade or grade point average.

An online alumni information area can include information for facilitating the university staying connected to students in order to better meet evolving needs and develop repeat business. This area can also include a mechanism for communications and marketing between students thereby fostering a strong alumni affiliation. The accessible data can include the names and addresses of graduated and current students as well as their current employer. In one embodiment a student can authorize automated online disclosure of academic records at Virtual University. One option can include disclosure of favorable skill sets obtained by the student. Data quantifying a skill set can also be made available to substantiate the students claim.

Functions of a financial services area can include collecting fees and awarding financial aid. Students can be made aware of fees associated with application, registration, books, ID cards, listservs, withdrawal fees, as well as penalty fees and other miscellaneous costs via the network interactive device. Students can register and pay for classes online through use of a secure credit transaction, or other arrangement such as wire transfer or account debit. Information regarding qualification requirements for financial aid can also be made available online as can financial aid applications. The Student Services interactive area can contain information regarding student resources, student development and student marketplace.

An interactive library can include access to online publications and databases including news wires, financial, legal, and business indices. Links from a Virtual University learning module can automatically branch to an online library resource. In addition, librarian assistance will be available for students in need of help locating supplemental research material. Resources such as an encyclopedia or course related material such as an Edinborgh publication can be available online.

Librarians can be reached via a Student Information Hotline. This line can be administered on the phone or by e-mail. Basically, students can send requests for information or other aid, and online staff can assist by locating the information or point the student to a proper resource. For example, while doing a project on the commodities market, a student may want to ascertain which country is the largest soybean producer in the world. The student can e-mail the request to the student information hotline and expect a reliable response within 24 hours.

An online bookstore interactive can be available for previewing and purchasing course materials. Course materials can be mailed to individual students. Book orders and payments can be administered over the phone or online in a seamless way during course registration.

A Student Advocacy area can handle complaints such as those with confidentiality, unfair practices or other course related issues. A student who has an administrative or academic complaint can access an Ombudsman who will resolve the complaint through mediation. In a case where a resolution cannot be solved by mediation, the complaint can be directed to a next highest office such as Dean or School President for review and investigation.

A Student Government interactive area may also be part of Student Advocacy services. The Student Government can serve as a sounding board for students who have ideas about how to improve the campus.

DETAILED DESCRIPTION

The present invention includes a Virtual Campus including interactive work plans and administrative resources presented online through an interactive interface. The interactive interface can include for example, a hypertext markup language (HTML) document presented as a network site and accessible with a uniform resource locator or transmission control protocol/internet protocol (TCPIP) address. Other markup languages may also be utilized such as extended markup language (XML).

Figure 1:
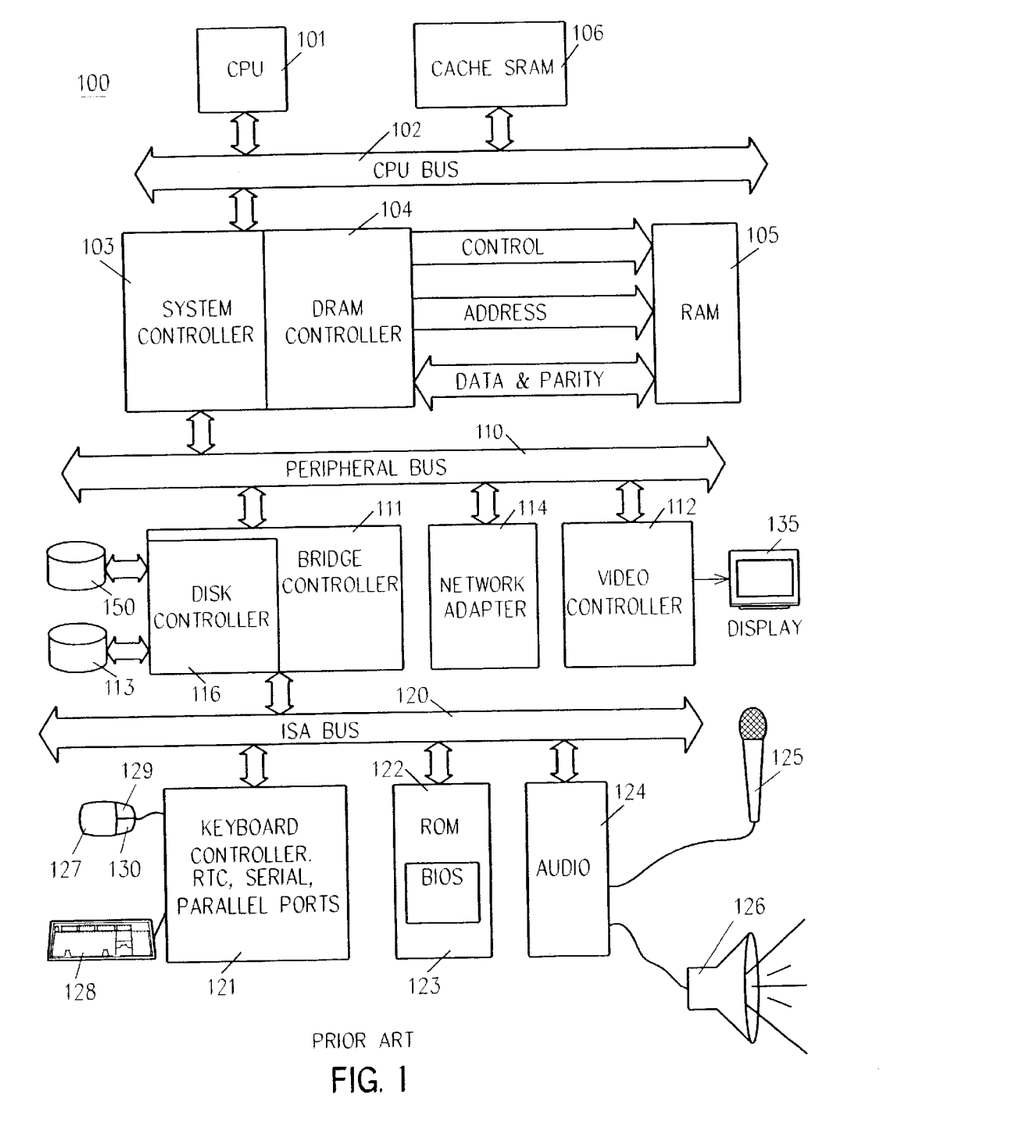
FIG. 1 is a description of a computer.

Referring to FIG. 1 physical resources of a computer system 100 are depicted. The computer 100 has a central processor 101 connected to a processor host bus 102 over which it provides data, address and control signals. The processors 101 may be any conventional general purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or an Extended Industry Standard Architecture (EISA) bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video display controller 112 and network controller 114 can be coupled to the peripheral bus 110. The network controller 114 may be a modem, an Ethernet networking card, a cable modem, or other network access device. The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100 the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110.

The computer 100 can also includes non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103. The BIOS 123 also includes routines that allow an operating system to be "booted" from the disk 113 or from a server computer using a local area network connection provided by the network adapter 114.

An operating system may be fully loaded in the RAM memory 105 or may include portions in RAM memory 105, disk drive storage 113, or storage at a network location. An operating system, can provide functionality to control computer peripherals and to execute user applications. Examples of high-level operating systems are, the Microsoft Windows 98™, Windows NT™, a UNIX™ operating system, the Apple MacOS™ operating system. The operating system can provide functionality to execute software applications 150, software systems and tools of software systems. Software functionality can access the video display controller 112 an other resources of the computer system 100 to provide educational modules on a computer screen and through other multimedia aspects of the computer 100. User applications 150 may be commercially available software programs such as a collaborative apprenticeship software, word processor, spreadsheet, database, internet access software and many other types of software.

Figure 2:
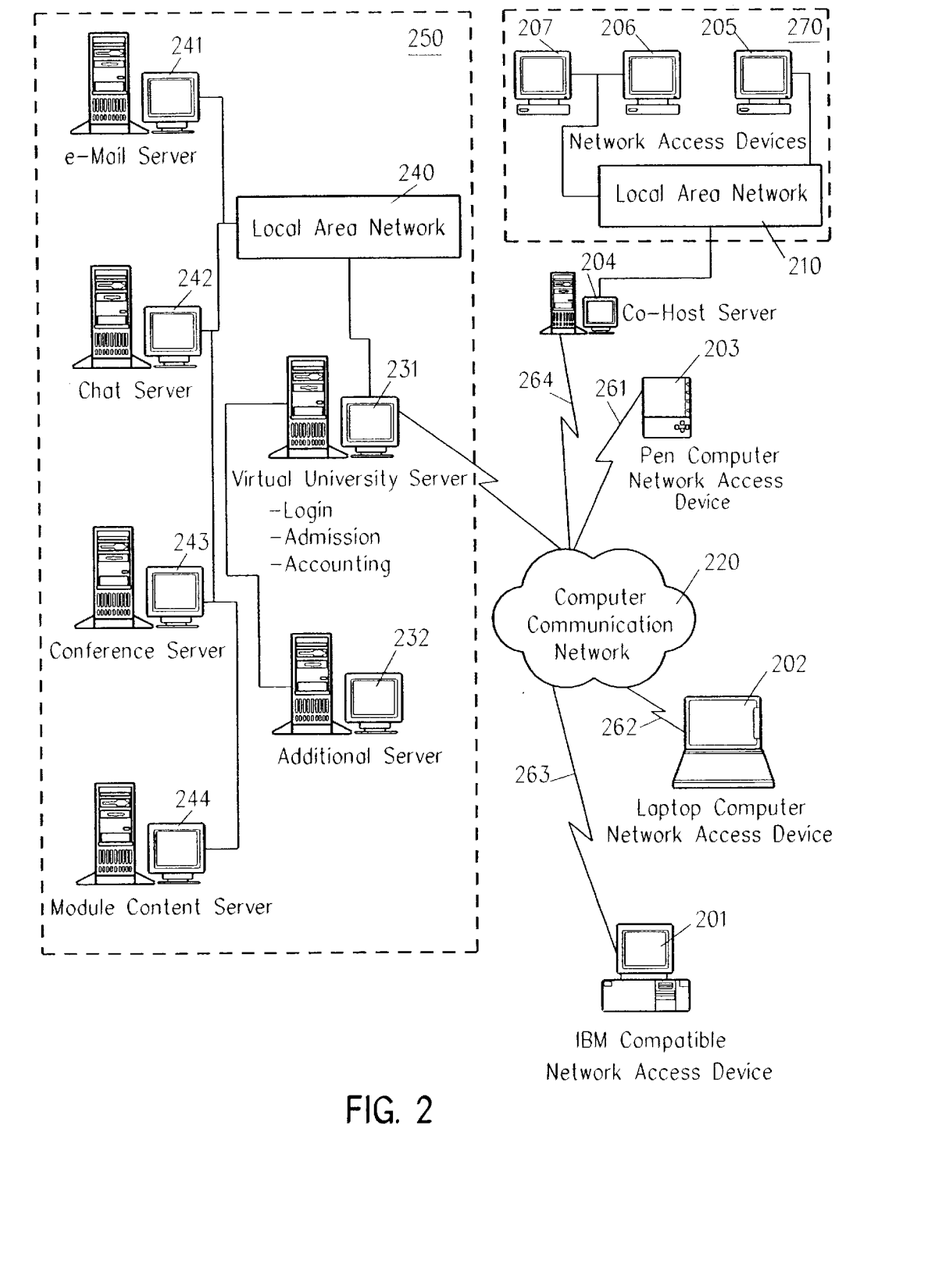
FIG. 2 illustrates a computer communications network according to this invention.

Referring now to FIG. 2, a collection of computers 100 can serve as components of a computer network 200. A computer network 200 can include a host computer system 250 and client computers 201–207. The client computers 201–207 can communicate with the host 250 to obtain data stored at the host 250 on servers 241–244. The client computer 201–207 may interact with the host computer 250 as if the host was a single entity in the network 200. However, the host 250 may include multiple processing and database sub-systems that can be geographically dispersed throughout the network 200.

In addition, client computers may include a tightly coupled cluster 205–207 of computers 100 at a first location that access data systems 2241–244 at remote locations. Each data system 241–244 may include additional processing components.

Client computers 201–207 can communicate with the host system 250 over wired or wireless mediums, for example, a private network or a combination of public switched telephone network dial-up connections and packet network interconnections. For example, client computers 201–203 may each include a modem coupled to voiceband telephone line 261–263. To communicate with the host 250, the client computers 201–203 establish a data connection with a local terminal server 225 by dialing a telephone number assigned to the local terminal server 225. A local terminal server 225 may have both dial-up and packet network interfaces allowing the server 225 to receive data from client computers 201–203, segment the received data into data packet payload segments, add overhead information to the payload segments, and send the resultant data packets over a link 221 to a packet data network 220 for delivery to the host system 250. Terminal servers 231 and 232 may also be referred to as a network service provider's point-of-presence (POP).

The overhead information added to the payload segments may include a packet header comprising a destination address assigned to the host system 250 and a source address assigned to a local terminal server 231. Other overhead information may include information associating the data packet with a specific client 201–203. Similarly, the host system 250 may send data to a client 201–203 by segmenting the data into data packet payload segments, and adding overhead information to send the data packet to a client 201–203 at the terminal server 225. Client computers 205–207 may similarly exchange data with the host 250 over communications link 264 to terminal server 231.

Data packet formats, switching equipment within the network 220, and networking protocols used within the network 220 may conform to the transmission control protocol/internet protocol (TCP/IP). In a TCP/IP implementation, the host 250, packet network terminal server 231 is assigned a unique internet protocol (IP) network address. TCP/IP switching equipment within the network 220 can direct a TCP/IP packet to an intended recipient based on the packet's destination IP address. Implementations may use other networking protocols and packet formats.

In one embodiment of the present invention a "co-host" server 204 can be utilized to facilitate access. In a co-host environment 270, a server 204 or cluster of servers can be connected to a local area network (LAN) 210 to serve course content and provide services such as e-mail, chat sessions, conferences, course content, accounting, admissions and login. An in-house connection to the LAN can provide greater speed and reliability in delivery of server content to a workstation.

Network access devices 201–207 can comprise a computer as described above or other network access device that adheres to a protocol such as the Internet protocol. Other examples include for example, TV WEB browsers, terminals, and wireless access devices. Preferably an access devices comprises a display capability, an input device and an electronic storage.

In addition to network access to course content it is possible to download interactive modules onto a personal computer, or other electronic device, so that the lesson modules can be conducted off-line.

Virtual Campus resources, including interactive work plans and administrative resources can be presented online through a interactive interface. A network access device 201–207 can access Virtual University resources through the interactive interface. The interactive interface can include for example, a hypertext markup language (HTML) document presented as a network site and accessible with a uniform resource locator or TCPIP address. Other markup languages may also be utilized such as extended markup language (XML). Through an interactive interface a learner can communicate with others, create and update an individual work plan, access needed resources and store cognitive artifacts or other work products. While online, learners may create work groups with other learners, use a suite of business tools, check with a registrar, or open a library data base. In addition, learners can store a project, present the project to others, or review work of fellow learners.

Figure 3:
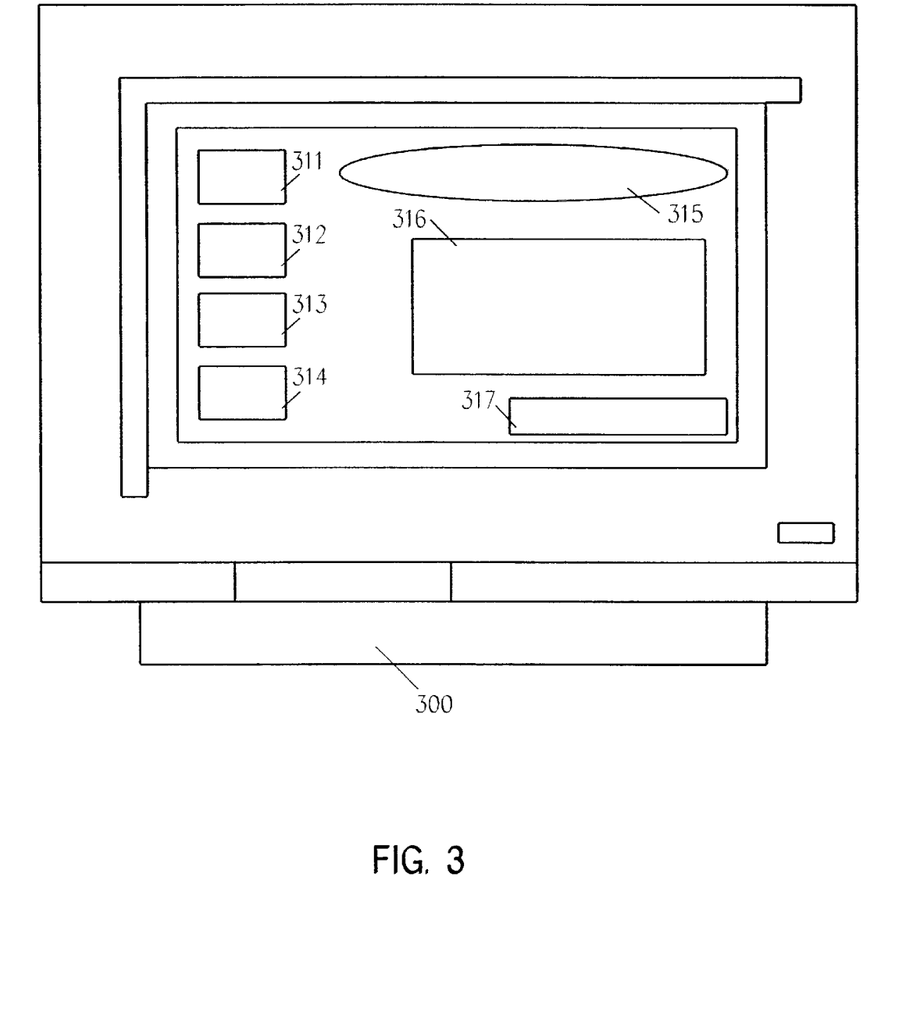
FIG. 3 illustrates block diagram of an online Virtual Campus.

Referring now to FIG. 3, an online Virtual Campus can include interactive areas 311–317 on a network access device display, each area can be programmed to provide a service such as those normally offered at a physical university campus. A student or other user can select a service by clicking on an associated area of the display with a mouse cursor or other pointing device.

Interactive areas can include, for example, a description of how a Virtual University operates, a course catalog, a faculty directory, academic policies, an academic/school calendar, administrative assistants, a registrar, a bursar, admissions, and frequently asked questions. The virtual online campus can be used to provide support services for a Virtual University, wherein established learning institutions team with an online educational provider to create asynchronous educational learning and award credited degrees.

Various functions available through interaction with the network access device can be arranged in an order to facilitate easy understanding by a student. In one embodiment, the services provided online can be arranged to emulate a physical university campus. Emulation of a physical campus can allow a student to locate a service according to a familiar outlay. To further facilitate a student's navigation through the online campus an interactive area dedicated to a description of how the program works can be prominently displayed. This area can include an explanation of how to apply for admissions and register for a course. It can also provide guidance pertaining to the Virtual University experience, from admissions through course completion and the granting of a degree. Demonstrations can also be included to illustrate typical course elements, a syllabus, chat sessions, or other online tools. In addition, descriptions of suitable network access devices specifying software and hardware requirements can also be included.

A course catalog can include a list of courses and course descriptions, as well as a description of accredited degree and certificate programs offered and the requirements necessary to obtain these acknowledgments. A description of the types of accreditation granted for each completed program can also be present.

Another interactive area can include a faculty directory including the names and academic backgrounds of the faculty involved in the development of each online course. For each faculty member, contact information, postal address, e-mail address, telephone number and a home page can also be available. In one embodiment, faculty home pages can include a picture of the faculty member and the office hours they are available online.

An academic policies area can include descriptions of the academic mission of the Virtual University as well as academic procedures. Procedures can include evaluation techniques including submission of cognitive artifacts and examinations. Grading policies and academic standing can also be included. This area can create a new screen providing additional interactive areas for conveying academic policies including misconduct and disciplinary policies, non-discrimination policies, confidentiality and a student grievance policy.

An area dedicated to the academic school year calendar can make available an annual calendar for events available online. For example, a calendar can include an announcement of a featured speaker or other school wide event. It can also display holidays when Virtual University personnel will not be available and point out that most services will remain available online 24 hours a day, 365 days a year.

An administrative assistants area can allow a student to access academic advising and course tutoring through a 24 hour academic help line and e-mail response. In addition a forum for posing questions to an associated Virtual University dean can be made available via e-mail, phone or a chat area.

Online admissions can provide a basic entry mechanism for an individual who wishes to become a student of the Virtual University. Admissions can include a substantive gateway for entering and partaking in the Virtual University. Basic information included in an Admissions area can include, a description of an admissions process and links to admissions application forms, academic information such as certificate and degree program requirements, a course catalog, tuition, fees and financial aid.

A registrar function can provide basic record keeping and authorization for students to enroll in courses. Services can be provided online and asynchronously thereby essentially eliminating the constraints associated with a physical campus, office hours and personnel availability. In addition, the automated nature of a Virtual Campus can provide historical information relating to a students' academic progress in real time. Grades can be displayed by course or a cumulative record at any time conducive to the student.

The registrar can also issue certificates, degrees or transcripts. Online courses are not held to physical constraints of class size or scheduled time slots. Asynchronous registrar functions enable a student to review a course name and description as well as the associated faculty. Interactive screens can include links to academic information including courses and programs, matriculation and catalog information. Links can also be provided to faculty and course evaluations enabling a student to make a more educated decision during enrollment. In one embodiment, a student can access a listing of other students who have taken available courses. The listing can include contact information enabling the prospective to contact the previous course takers. Contact can be facilitated through the Virtual Campus.

Other functions that can be made available from the registrar screen include links to a library or other academic resource center enabling a student to review course materials and thereby further aid in the decision to register. The registrar can also link to financial information including billing, payments and financial aid as well as links to a bookstore facilitating a convenient purchase of course materials or books.

Other traditional registrar functions available online, without requiring Virtual University staff attention, can include adding and dropping a course. An optional graduated refund policy can be automated online such that a student can receive a prorated refund for dropping a course relative to the student's progression through the course material. Still more registrar functions can include issuing a student's transcripts, academic progress and grades. Artificial intelligence built into Virtual Campus software can offer advice to a student pertaining to degree requirements and course selection based on a specific student's academic records. The software can extrapolate a student's academic record and make recommendations regarding scheduling, matriculation and pursuit of a particular degree.

An online registrar can also allow a student to update personal information online in real time. Frequently asked questions can be made available online as can the ability for a student to pose a specific question to an Online Campus registrar. Responses to a posted question can be made privately to the specific student requesting the information or posted in a public forum allowing other students to also review the information.

Student records can be made secure through various online security measures including passwords and encryption. The online interactive nature of an Online Campus can provide a student with real time access to the student's academic record and educational progress. A student can view and print grades by each course or as a cumulative record. In addition, certificates, degrees, or modules completed can be automatically generated and issued, including the production of official diplomas, certificates and transcripts.

Another useful feature available via an online Virtual Campus is the ability to assess skills a student has successfully mastered by analyzing progress through the aggregate of course modules completed. Academic and career guidance can be formulated referencing the accumulated detail of a particular students learning experience. Each software module and element can have a list of skills associated with it. The Virtual Campus can maintain a listing of skills a student has demonstrated proficiency in. Proficiency can be evaluated through the completion of associated modules. The listing can be databased to facilitate retrieval and presentation of the information. The ease or difficulty a student experiences as the student encounters each element can be databased and later referenced by the student, or other interested party. The database of skills can detail a students capabilities with data quantifying a student's accomplishments. This data can be offered as a credible measurement in addition to a final grade, or cumulative grade point average. In one embodiment, the database can be updated in real time, tracking completion of each individual element completed by the student.

An Online Campus bursar can enable students to pay for courses via the communications network. Services offered by the online bursar can include apprising a student of the cost of registration, books, ID cards, list serves, withdrawal fees or other miscellaneous costs up front. Payment can be made through the computer communications network using a secure online payment method. Information regarding qualification requirements for financial aid can also be made available online as well as financial aid applications and advice.

A career services function can be programmed to provide various resources to aid a student through a job search. Virtual campus career services can include job posting through an online bulletin board, career tips provided by industry professionals advising students on various career tracks and resume builders including a service to allow a student to e-mail a resume that can be critiqued and enhanced. Additional career services available online can include an interview skill builder providing a virtual interview to develop interviewing skills as well as placement and recruiting and mentor matching.

Figure 4:
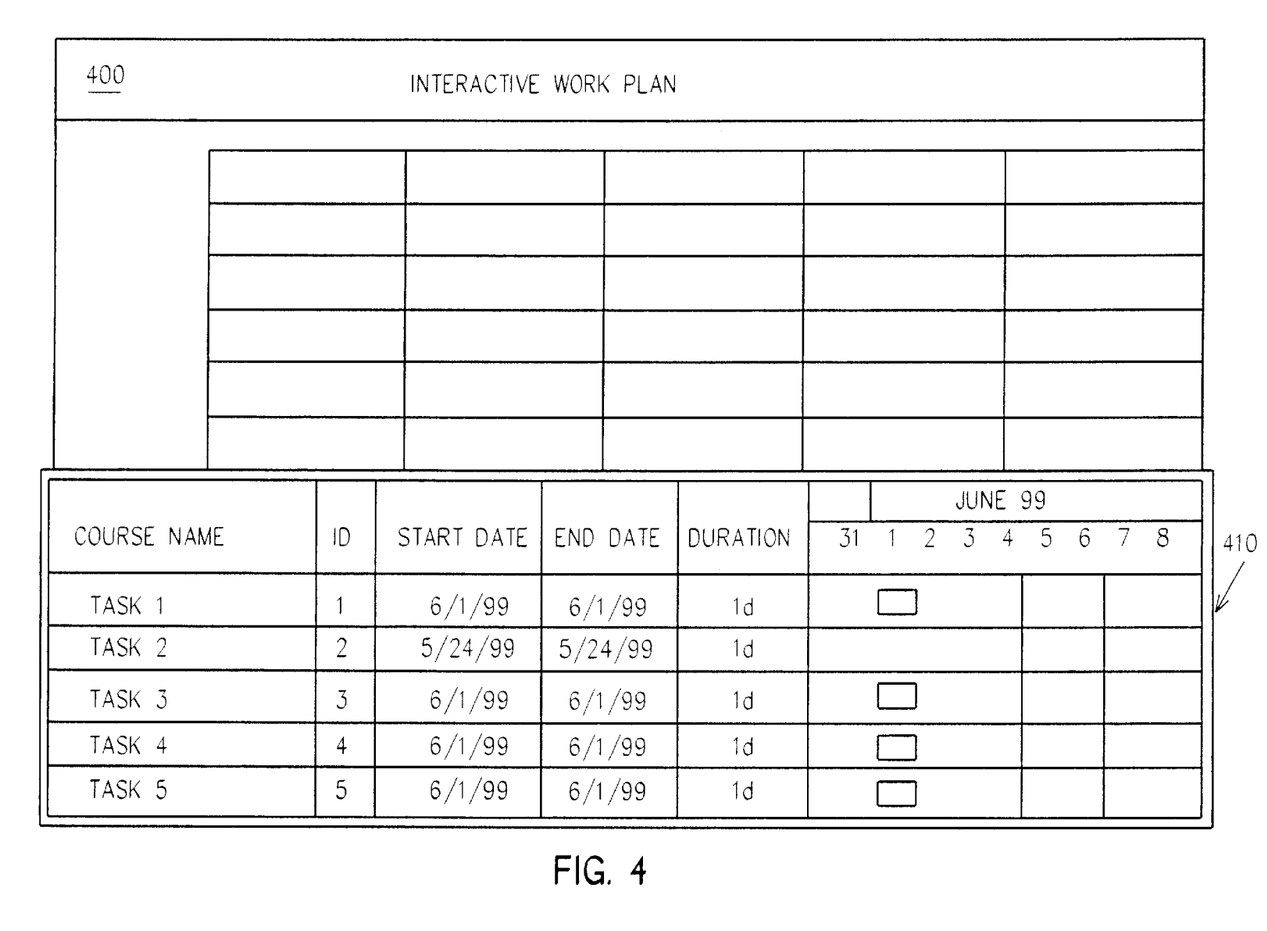
FIG. 4 illustrates a block diagram of an interactive work plan.

Referring now to FIG. 4, an Online Virtual Campus can include a personalized interactive work plan 400 for each student to encourage persistence, offer support and create a feeling of community. Building an interactive work plan can be accomplished with inter student participation and begin with a motivation piece. For example, when logging into a course a student may be motivated by a video that highlights the importance of the course content e.g., "Why Finance Matters". The video can also be used to explain any related administrative matters. New users can also be offered a tutorial on how the Virtual University software works.

In one embodiment a student interface to an IWP can be an interactive worksheet that allows a student to plot a course syllabus on a calendar 411. The worksheet can include information outlining the requirements of a pending element included in the syllabus. Information can include, for example, listings of suggested readings, problems, labs, cognitive artifacts to be submitted and multimedia presentations. The outline can contain enough detail to facilitate a student estimating a completion date for each element. In one embodiment IWPs can be accessed via an online organizer and changed at any time.

Information from the IWP can be stored in a database and compared to actual student progress. This comparison can be used to automatically generate e-mail messages from academic staff to the student. The IWP can also be accessed by the registrar to facilitate offering of academic advice relating to matriculation and the granting of degrees.

Messages can include, for example, a first type directed to a student progressing according to the schedule they set forth in the IWP. This first type of message can convey encouragement and support. In one embodiment, each module can cause three or four of the first type of message to be displayed. A second type of message can be directed to those students who are falling behind. The second type of message can encourage a student to apply additional energies and also offer additional help. For example, if a student is spending more than the scheduled time reviewing capital structure, that student can be sent a message stating, "we notice you have been reviewing capital structure if you are looking for extra help with this concept, try our interactive tutorial at www.capital-structure.wer.uk. In addition, we have additional explanatory material in our library which can be accessed by clicking on a library resources button available in an IWP organizer.

If progress continues to lag behind the schedule set forth in the IWP another message can be generated asking the student to e-mail academic staff regarding problems they may be experiencing.

An additional type message can be used to congratulate a student when the student reaches a predetermined check point as they progress through a module. Check points can also be used to offer additional learning opportunities and challenges. For example, a message might include an additional assignment or resource referral that is not in the syllabus.

Figure 5:
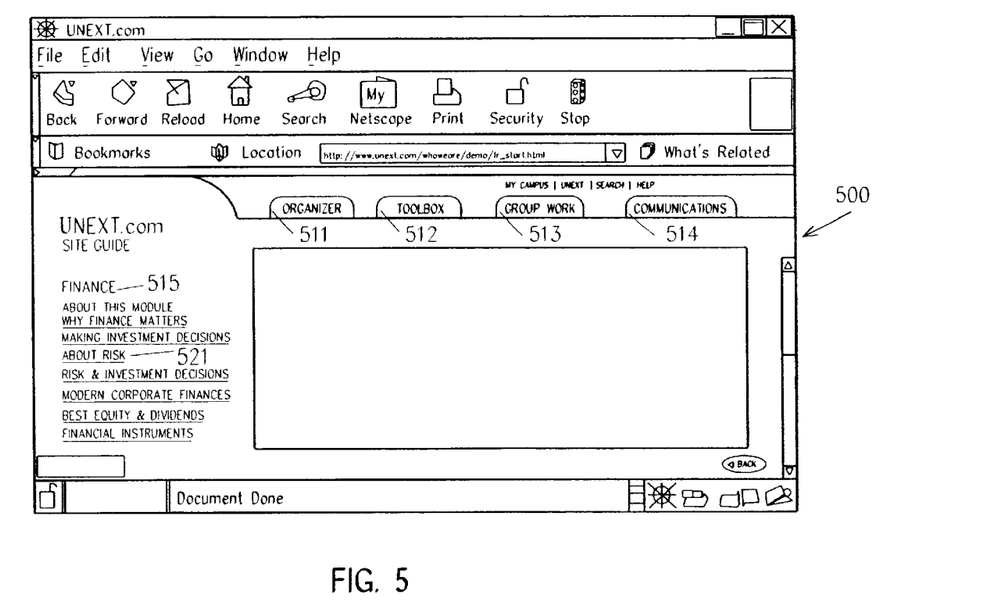
FIG. 5 illustrates one embodiment of a Virtual Campus.

Referring now to FIG. 5, in one embodiment, a Virtual Campus can be displayed via a network browser such as Netscape™ or Internet Explorer™. A specific example of a Virtual University displayed as a website screen can include links to various functions of the university. Functions can include an organizer 511, a toolbox 512, group work 513, and communications 514. In addition the website display can include a module topic 515, a list of elements 521 included in the module displayed, a text section 522 and a document specific to the module or elements selected.

Figure 6:
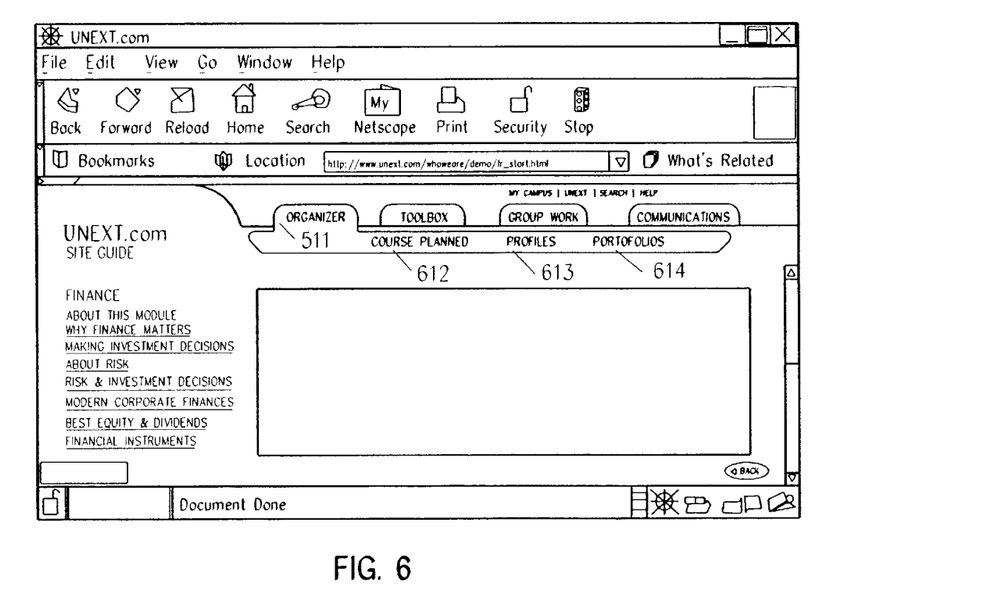
FIG. 6 illustrates a Virtual Campus with an organizer link selected.

Referring now to FIG. 6, selection of a link such as the organizer 511 can cause additional Virtual University functions to appear that relate to that link. For example, functions relating to the organizer 511 can include a course planner 611, profiles 612 and portfolios 613.

Figure 7:
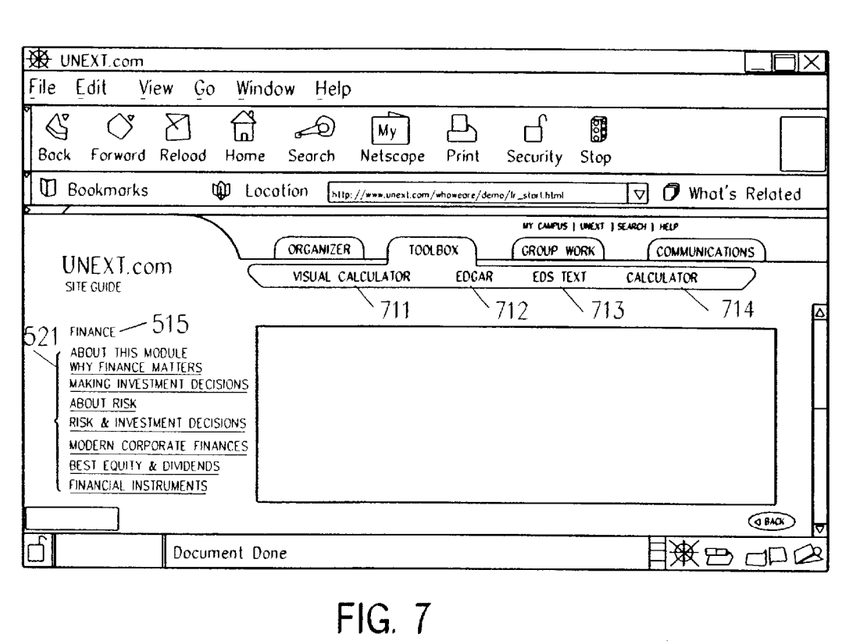
FIG. 7 illustrates a toolbox with proprietary and public tools linked.

Referring now to FIG. 7, functions relating to a link 511–514, such as a toolbox link, can include both proprietary and public programming. For example, a visual calculator function 711 can be a proprietary program specific to the Virtual University and a public function such as EDGAR 712 can port the student to a public facility such as those available on the internet. Other functions can include copyrighted documents such as EBS text 713 or a general purpose tool such as a calculator 714. Functions and tools displayed can be specifically related to the module 515 and element 521 selected. In this manner, the Online Campus can present on a desktop 500 tools 711–714 necessary for a student to complete a task associated with a particular element 521.

Figure 8:
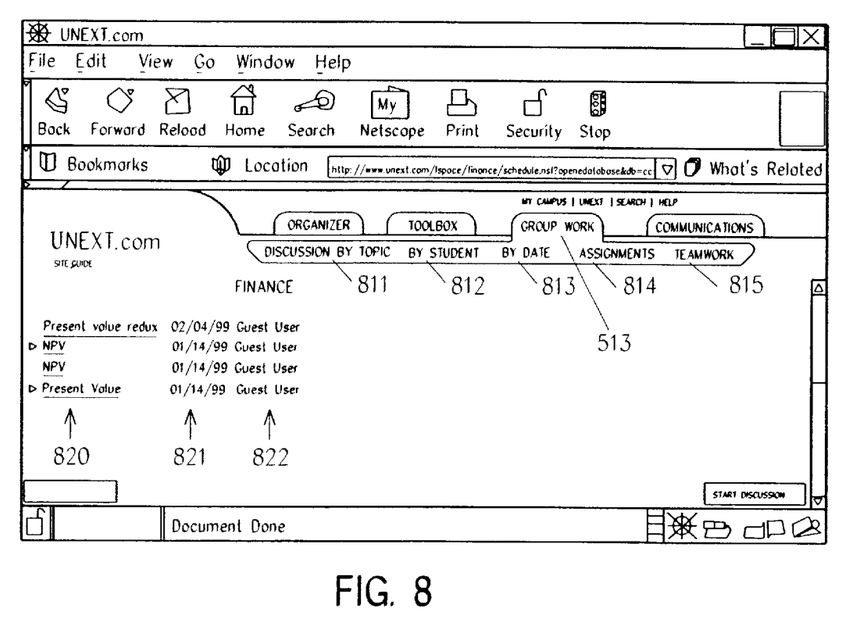
FIG. 8 illustrates a Virtual Campus with a group work listed by topic.

Referring now to FIG. 8, a group work link 513 can include discussions, reference documents, cognitive artifacts, or other materials conducive to tasks performed as a group. Discussion documents 811–813 can be arranged by topic 811, by student 812 or by date 813. Group work arranged by topic will first include the topic name 820 the date last modified 821, a student responsible for posting the document 822. Group work can also include module assignments 814 and work product developed as a team under teamwork 815.

Figure 9:
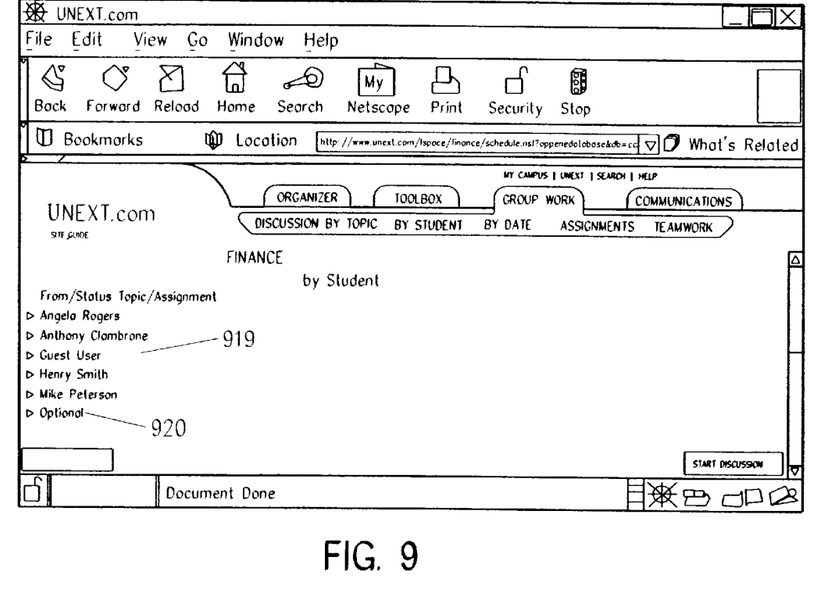
FIG. 9 illustrates a Virtual Campus with a group work listed by student.

Referring now to FIG. 9, discussion documents listed by student can display a list of students 919 including an option entry 920 for those documents not traceable to a particular student. Student names can be listed in an order conducive to locating a desired name such as alphabetical by first name as illustrated here.

Figure 10:
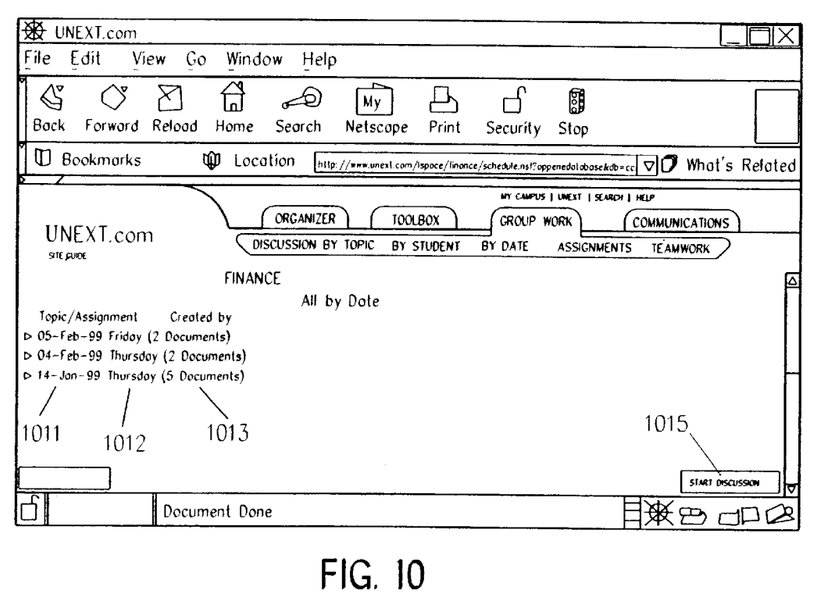
FIG. 10 illustrates a Virtual Campus with a group work listed by date.

Referring now to FIG. 10, discussion documents can also be listed by date such that a user can access documents according to the day of the year 1011 and the day of the week 1012. In addition, the number of documents available for each day can be displayed 1013. Interactive areas can also be used to designate other functionalities. For example, a start discussion box 1015 can be responsive to activation by clicking a mouse button while positioning the cursor over the box 1015. A dialog can be automatically implemented with other members of a team responsive to activation of the start discussion box 1015.

Figure 11:
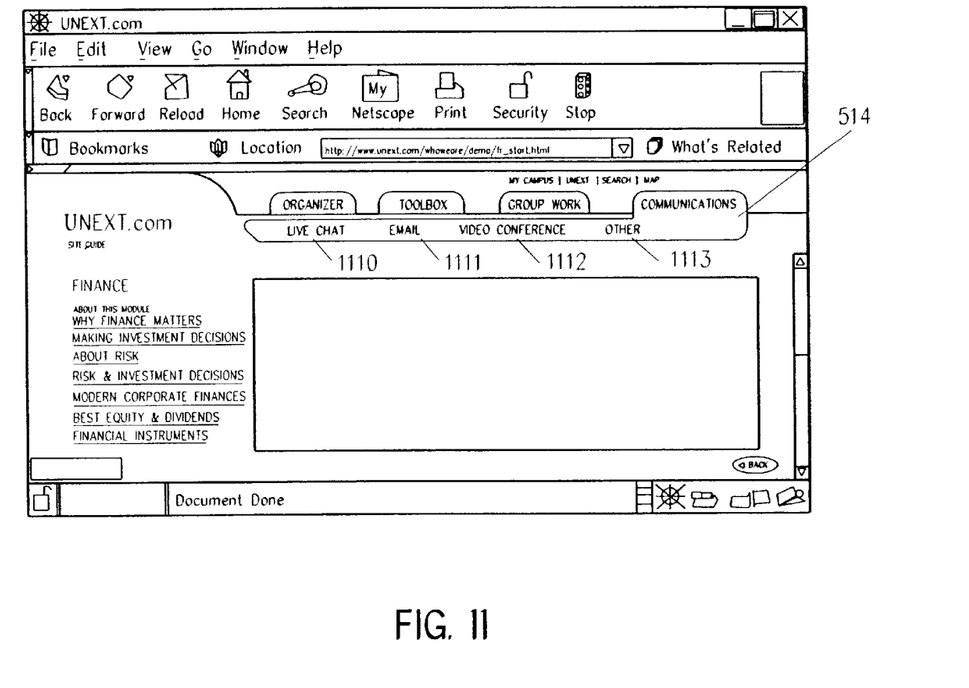
FIG. 11 illustrates a Virtual Campus with communications options listed.

Referring now to FIG. 11, a communications function 514 can be used to implement dialog with team members involved in a group activity. Other options include communicating with a general student population or Virtual University staff. Communications vehicles can include a live chat 1110, e-mail 1111, video conference 1112 or other communications means, including voice telephone 1113.

The invention may be implemented in digital electronic circuitry, or in computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Software for organizing and delivering information stored on the server computers can include for instance Learning Space™ by Lotus Development Corporation or Oracle™ database products. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

The course content for delivery over the WEB via an Online Campus can be developed in conjunction with a qualified learning institution. An institution can provide personnel to act as consultants in developing course content. In addition the professors can create video clips, audio clips, simulations, animated concepts, multimedia presentations and passive illustrations to be used during the instructional sessions. The institution can act as a quality control agent to insure that course content and delivery retain quality representative of institutions standards.

The course provider can be responsible for degree granting and accreditation. Affiliated institutions can also provide certificates. The certificates can acknowledge successful completion of the modules developed by the affiliated institution.

What is claimed is:

1. An online educational campus accessible with a network access device via a computer communications network, the campus comprising:
   a computer system hosting a network interface;
   software operative on the computer system and responsive to commands entered via the network access device, the software providing:
   an interactive work plan associated with a student for plotting a course syllabus having a plurality of elements, said interactive work plan providing said student with requirements for at least one of said plurality of elements, said student entering into said interactive work plan an estimated completion date for at least one of said plurality of elements; and
   a skills database, said skills database receiving a completion date for which said student completed at least one of said plurality of elements, wherein said student's progress is evaluated by comparing said completion date with said estimated completion date.

2. The online educational campus of claim 1 wherein the network interface is an interactive markup language document.

3. The online educational campus of claim 1 wherein the network adheres to the internet protocol.

4. The online educational campus of claim 1 additionally comprising software operative with the computer system for providing a bursar function for receiving payment for educational services.

5. The online educational campus of claim 1 additionally comprising software operative with the computer system for providing student transcripts.

6. The online educational campus of claim 1 additionally comprising software operative with the computer system for issuing online educational degrees.

7. The online educational campus of claim 1 additionally comprising software operative with the computer system for issuing certificates acknowledging completion of a predetermined set of education modules.

8. The online educational campus of claim 1 wherein the skills database is updated in real time tracking the completion of education modules.

9. The online educational campus of claim 1 additionally comprising software operative with the computer system for registering for online educational courses.

10. The online educational campus of claim 1, further comprising a registrar module in communication with said interactive work plan, said registrar module providing said student with academic advice based on contents of said interactive work plan.

11. A method of providing university related services to a student via a computer communications network, the method comprising:
   hosting an interactive network interface on the computer communications network, said interface accessible via a network access device;
   identifying a student accessing the interface;
   forming an interactive work plan associated with said student accessing the interface for plotting a course syllabus having a plurality of elements;
   providing said student with requirements for at least one of said plurality of elements;
   receiving from said student an estimated completion date for at least one of said plurality of elements;
   serving to said student an education module associated with said course in specified in said interactive work plan;
   storing a completion date for at least one of said plurality of elements; and assessing said student's progress by comparing said estimated completion date to said completion date.

12. The method of claim 11 additionally comprising the step of:
   automatically issuing a degree to the student responsive to the student completing predetermined coursework required for the degree.

13. The method of claim 11 additionally comprising the step of:
   formulating academic guidance referencing the database of the students accumulated skills.

14. The method of claim 11 additionally comprising the step of:
   formulating career guidance referencing the database of the students accumulated skills.

15. The method of claim 11 wherein the interactive interface is accessed via a WEB interface.

16. The method of claim 11 additionally comprising the steps of:

displaying a list of available courses descriptions and the cost of each course on the interactive interface;

analyzing the interactive work plan corresponding to the student accessing the interface; and advising the student with a progression of available courses wherein the progression is calculated to aid the student accomplish a goal specified in the interactive work plan.

17. The method of claim 11, further comprising the step of:

providing academic advice based on contents of said interactive work plan.

18. A computer data signal embodied in a digital data stream comprising an online campus, wherein the computer data signal is generated by a method comprising the steps of:

hosting an interactive network interface on the computer communications network, said interface accessible via a network access device;

identifying a student accessing the interface;

forming an interactive work plan associated with said student accessing the interface for plotting a course syllabus having a plurality of elements;

providing said student with requirements for at least one of said plurality of elements; receiving from said student an estimated completion date for at least one of said plurality of elements;

serving to said student an education module associated with said course in specified in said interactive work plan;

storing a completion date for at least one of said plurality of elements; and assessing said student's progress by comparing said estimated completion date to said completion date.

19. A computer data signal as in claim 18 wherein the signal is further generated by a method comprising the additional steps of:

monitoring progress towards accomplishing goals specified in the interactive work plans; and displaying messages responsive to the progress monitored.

20. The computer data signal of claim 18, wherein the signal is further generated by a method comprising the additional step of:

providing academic advice based on contents of said interactive work plan.

21. Computer executable program code residing on a computer-readable medium, the program code comprising instructions for causing the computer to:

host an interactive network interface on the computer communications network, said interface accessible via a network access device;

identify a student accessing the interface;

form an interactive work plan associated with said student accessing the interface for plotting a course syllabus having a plurality of elements;

provide said student with requirements for at least one of said plurality of elements;

receive from said student an estimated completion date for at least one of said plurality of elements;

serve to said student an education module associated with said course in specified in said interactive work plan;

store a completion date for at least one of said plurality of elements; and assess said student's progress by comparing said estimated completion date to said completion date.

22. The computer executable program of claim 21 wherein the program code additionally causes the computer to:

display an interactive listing of available communications vehicles available; and implement a communications session responsive selection of a communication vehicle.

23. The computer executable program of claim 21 wherein the computer communications network is a Transmission Control Protocol/Internet Protocol network.

24. The computer executable program of claim 21, wherein the program code additionally causes the computer to:

provide academic advice based on contents of said interactive work plan.

* * * * *